(12) United States Patent
Suzuki

(10) Patent No.: US 11,027,426 B2
(45) Date of Patent: Jun. 8, 2021

(54) ROBOT SYSTEM AND CONTROL METHOD OF ROBOT SYSTEM FOR TAKING OUT WORKPIECES LOADED IN BULK

(71) Applicant: FANUC CORPORATION, Yamanashi (JP)

(72) Inventor: Tadanori Suzuki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 239 days.

(21) Appl. No.: 16/384,927

(22) Filed: Apr. 16, 2019

(65) Prior Publication Data
US 2019/0351549 A1 Nov. 21, 2019

(30) Foreign Application Priority Data
May 18, 2018 (JP) .............................. JP2018-096328

(51) Int. Cl.
*G06F 7/00* (2006.01)
*B25J 9/16* (2006.01)
*B25J 15/08* (2006.01)

(52) U.S. Cl.
CPC ............ *B25J 9/1666* (2013.01); *B25J 9/1697* (2013.01); *B25J 15/08* (2013.01)

(58) Field of Classification Search
CPC ........ B25J 9/1666; B25J 15/08; B25J 9/1697; B25J 15/0253; B25J 15/0042; B25J 9/1602; B25J 9/023; B25J 13/087; B25J 15/0246; G05B 2219/40559; G05B 2219/40053
USPC ................ 700/213, 214, 217, 218, 228, 245
See application file for complete search history.

(56) References Cited

U.S. PATENT DOCUMENTS

2018/0250822 A1* 9/2018 Shimodaira ............ B25J 9/1697
2018/0250823 A1* 9/2018 Shimodaira ............ B25J 9/1671

FOREIGN PATENT DOCUMENTS

| JP | 3925020 B2 | 6/2007 |
|---|---|---|
| JP | 2014-210311 A | 11/2014 |
| JP | 2017170560 A | 9/2017 |

* cited by examiner

*Primary Examiner* — Yolanda R Cumbess
(74) *Attorney, Agent, or Firm* — Hauptman Ham, LLP

(57) ABSTRACT

A robot system is provided with a robot, a hand, and a range sensor that acquires information about a distance to a workpiece. Claw parts of the hand include grip regions having a shape for gripping the workpiece. A controller stops the robot when the hand collides with the workpiece. The controller determines whether or not a target workpiece can be gripped by a part other than the grip regions of the hand. When it is determined that the target workpiece can be gripped by the part other than the grip regions, the controller performs control for gripping the target workpiece by using the hand, and for moving the target workpiece inside a container.

14 Claims, 13 Drawing Sheets

ROBOT SYSTEM AND CONTROL METHOD OF ROBOT SYSTEM FOR TAKING OUT WORKPIECES LOADED IN BULK

RELATED APPLICATIONS

The present application claims priority of Japanese Application Number 2018-096328, filed May 18, 2018, the disclosure of which is hereby incorporated by reference herein in its entirety.

BACKGROUND OF THE INVENTION

1. Field of the Invention

The present invention relates to a robot system and a control method of the robot system for taking out workpieces loaded in bulk.

2. Description of the Related Art

When many workpieces are stored in a vessel such as a container, the workpieces may be arranged in a manner in which intervals between the workpieces and orientations of the workpieces are irregular. In other words, there is a case in which the workpieces inside the container are loaded in bulk. In technology of related art, a robot system provided with a robot for taking out workpieces from inside a container in which the workpieces are loaded in bulk is known (Japanese Unexamined Patent Publication No. 2014-210311 A, for example).

The workpieces loaded in bulk are stored at varying intervals and with varying orientations. As a result of this, the workpiece is preferably taken out after a position and orientation of the workpiece are detected. In the technology of the related art, the use of a three-dimensional sensor for detecting the position and orientation of the workpiece is known (Japanese Patent No. 3925020B, for example). In this method, the three-dimensional sensor is used for capturing an image of the workpiece arranged in the container. Information such as about a three-dimensional point group of the workpieces loaded in bulk can be acquired by using the image acquired by the three-dimensional sensor. Then, the position and orientation of the workpiece can be detected, and the position and orientation of the robot can be controlled on the basis of the position and orientation of the workpiece.

SUMMARY OF THE INVENTION

A hand that has claw parts for clamping the workpiece can be used as an end effector that grips the workpiece. The three-dimensional sensor can detect the positions and orientations of the workpieces loaded in bulk on an uppermost layer. In other words, the position and orientation of the workpiece arranged in a position that is visible from the three-dimensional sensor can be detected. As the three-dimensional sensor, the use of a stereo camera provided with two cameras is known. In the stereo camera, a position of a measurement point set on the surface of the workpiece can be detected on the basis of two-dimensional images captured by the two cameras.

However, when one of the two cameras cannot capture the images of the workpiece in the stereo camera, the position and orientation of the workpiece cannot be accurately detected. For example, in a case where an image of a workpiece cannot be captured as a result of a dead angle of another workpiece, the position and orientation of the workpiece cannot be detected. Thus, in the course in which the hand advances to a target position, the claw parts may collide with the other workpiece, and the claw parts of the hand may be unable to advance to the target position. As a result of this, it may not be possible to take out the workpiece. When it is not possible to take out the workpiece in an upper part of the container, it is difficult to take out the workpiece arranged in a lower part of the container, and an incomplete removal may occur.

With respect to the workpiece that cannot be taken out by the robot, an operation for taking out the workpiece is temporarily suspended. Then, load collapse can be caused to occur by taking out the surrounding workpieces. After this, the operation for taking out the workpiece that could not be taken out can be attempted. However, in this control, even in a case where the load collapse occurs, the workpiece may not have a desired position and orientation. Alternatively, the load collapse may not occur. As a result, the workpiece that cannot be taken out may remain in the container. In this way, there is room for improvement in the control for taking out the workpieces loaded in bulk.

A first aspect of the present disclosure is a robot system for taking out each of workpieces loaded in bulk inside a container. The robot system includes a hand including a plurality of claw parts and configured to grip the workpiece by using the claw parts, and a robot configured to move the hand. The robot system includes a three-dimensional sensor configured to acquire information about a distance to the workpiece, and a controller configured to control the hand and the robot. The claw parts include grip regions having a shape for gripping the workpiece. The controller includes an acquisition unit for acquiring three-dimensional information of the workpiece on the basis of an output of the three-dimensional sensor, and a selection unit for selecting a target workpiece to be taken out by the robot on the basis of the three-dimensional information of the workpiece. The controller includes a collision detecting unit for stopping the robot in response to the hand colliding with the workpiece while the robot is moving to a target position for gripping the target workpiece, and a position detecting unit for detecting a stop position of the robot stopped by the collision detecting unit. The controller includes a determination unit for determining, on the basis of the target position and the stop position of the robot, whether or not the target workpiece is able to be gripped by a part other than the grip regions of the hand. The controller includes a movement control unit for controlling the robot so as to move the workpiece inside the container. When the determination unit determines that the target workpiece can be gripped by the part other than the grip regions, the movement control unit performs a control for gripping the target workpiece by the hand and releasing the target workpiece after moving the target workpiece.

A second aspect of the present disclosure is a robot system for taking out each of workpieces loaded in bulk inside a container. The robot system includes a hand including a plurality of claw parts and configured to grip the workpiece by using the claw parts, and a robot configured to move the hand. The robot system includes a three-dimensional sensor configured to acquire information about a distance to the workpiece, and a controller configured to control the hand and the robot. The claw parts include grip regions having a shape for gripping the workpiece. The controller includes an acquisition unit for acquiring three-dimensional information of the workpiece on the basis of an output of the three-dimensional sensor, and a selection unit for selecting a target workpiece to be taken out by the robot on the basis of the three-dimensional information of the workpiece. The controller includes a collision detecting unit for stopping the robot in response to the hand colliding with the workpiece while the robot is moving to a target position for gripping the target workpiece, and a position detecting unit for detecting a stop position of the robot stopped by the collision detecting unit. The controller includes a determination unit for determining, on the basis of the target position and the stop position of the robot, whether or not the target workpiece is able to be pressed by a part other than the grip regions of the hand. The controller includes a movement control unit for controlling the robot so as to move the workpiece inside the container. When the determination unit determines that the target workpiece can be pressed by the part other than the grip regions, the movement control unit controls the robot so as to move the hand in the horizontal direction without driving the claw parts, and press the workpiece by the hand.

A third aspect of the present disclosure is a control method of a robot system including a robot and a hand provided with a plurality claw parts for taking out each of workpieces loaded in bulk inside a container. The control method includes an image capturing step for capturing an image of the workpiece by using a three-dimensional sensor configured to acquire information about a distance to the workpiece, and an acquisition step for acquiring three-dimensional information about the workpiece on the basis of an output of the three-dimensional sensor. The control method includes a selection step for selecting a target workpiece to be taken out by the robot on the basis of the three-dimensional information of the workpiece. The control method includes a stopping step for stopping the robot in response to the hand colliding with the workpiece while the robot is moving to a target position for gripping the target workpiece, and a detection step for detecting a stop position of the robot stopped in the stopping step. The control method includes a determination step for determining, on the basis of the target position and the stop position of the robot, whether or not the target workpiece can be gripped by a part other than grip regions of the hand, which has a shape for gripping the workpiece. The control method includes a movement step for controlling the robot so as to move the workpiece inside the container after the hand collides with the workpiece. When it is determined in the determination step that the target workpiece can be gripped by the part other than the grip regions, the movement step includes a step for gripping the target workpiece by the hand and releasing the target workpiece after moving the target workpiece.

A fourth aspect of the present disclosure is a control method of a robot system including a robot and a hand provided with a plurality claw parts for taking out each of workpieces loaded in bulk inside a container. The control method includes an image capturing step for capturing an image of the workpiece, by using a three-dimensional sensor configured to acquire information about a distance to the workpiece, and an acquisition step for acquiring three-dimensional information about the workpiece on the basis of an output of the three-dimensional sensor. The control method includes a selection step for selecting a target workpiece to be taken out by the robot, on the basis of the three-dimensional information of the workpiece. The control method includes a stopping step for stopping the robot in response to the hand colliding with the workpiece while the robot is moving to a target position for gripping the target workpiece, and a detection step for detecting a stop position of the robot stopped in the stopping step. The control method includes a determination step for determining, on the basis of the target position and the stop position of the robot, whether or not the target workpiece is able to be pressed by a part other than grip regions of the hand, which has a shape for gripping the workpiece. The control method includes a movement step for controlling the robot so as to move the workpiece inside the container after the hand collides with the workpiece. When it is determined in the determination step that the target workpiece can be pressed by the part other than the grip regions, the movement step includes a step for controlling the robot so as to move the hand in the horizontal direction without driving the claw parts, and press the workpiece by the hand.

DETAILED DESCRIPTION

A robot system and a control method of the robot system according to an embodiment will be described with reference to FIG. 1 to FIG. 17. The robot system of the present embodiment takes out workpieces piled up inside a container and performs an operation for transporting each of the workpieces to a predetermined position.

Figure 1:
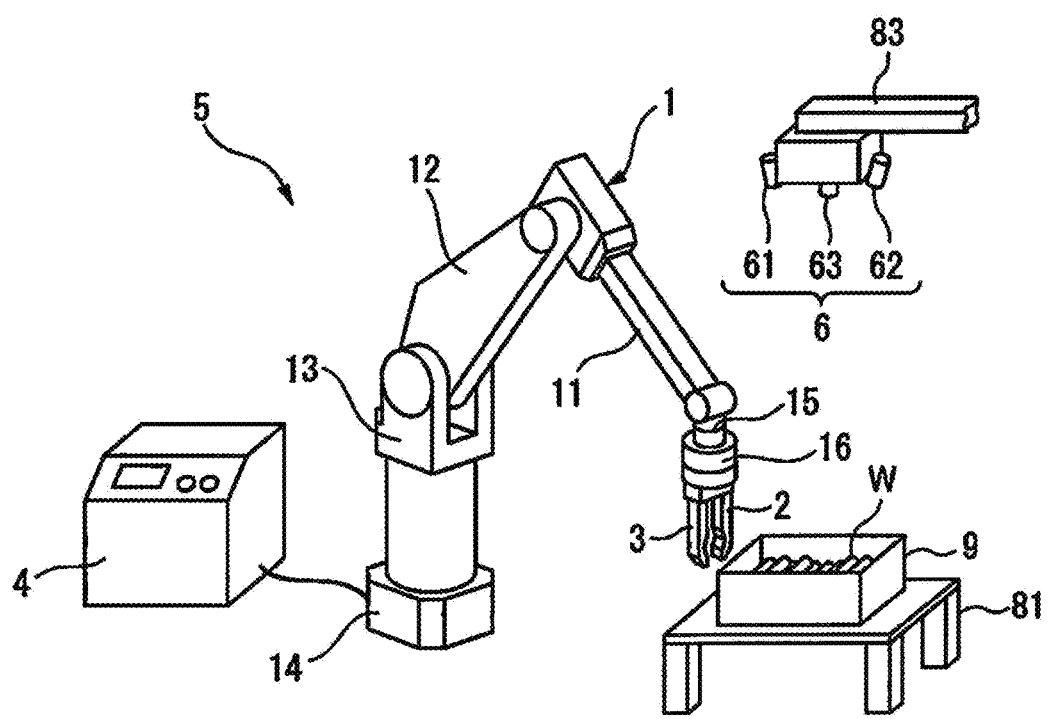
FIG. 1 is a perspective view of a robot system of an embodiment.

FIG. 1 is a perspective view of the robot system of the present embodiment. A robot system 5 is provided with a robot 1 and a hand 2. The robot system 5 is provided with a controller 4 that controls the robot 1 and the hand 2. The robot 1 of the present embodiment is an articulated robot including a plurality of joints. The robot 1 of the present embodiment includes an upper arm 11 and a lower arm 12. The lower arm 12 is supported by a swivel base 13. The swivel base 13 is supported by a base 14. The robot 1 includes a wrist 15 that is coupled to an end portion of the upper arm 11. The wrist 15 includes a flange 16 that fixes to the hand 2. These structural members of the robot 1 are formed so as to rotate around predetermined rotation axes. The robot is not limited to the example described above, and any robot that is capable of changing the position and orientation of the hand can be employed.

The hand 2 is an operation tool that grips and releases a workpiece W. The hand 2 has a plurality of claw parts 3. The claw parts 3 grip the workpiece W by clamping the workpiece W. The hand 2 is formed such that the claw parts 3 open and close. The hand 2 of the present embodiment has two of the claw parts 3 but is not limited to this example. The hand may grip the workpiece by three or more of the claw parts.

The workpieces W are arranged inside a container 9 serving as the vessel. Any member can be employed as the vessel such as a box, a bag, or the like, that can store the workpieces W. The workpieces W are loaded in bulk inside the container 9. The container 9 is placed on a frame 81. The robot system 5 of the present embodiment takes out the workpieces W from the container 9 one at a time, and transports each of the workpieces W to the predetermined position.

The robot system 5 is provided with a range sensor 6 serving as a three-dimensional sensor for detecting the position and orientation of the workpiece W. The range sensor 6 acquires information about a distance from the range sensor 6 to the workpiece W. The range sensor 6 is disposed in a position at which the range sensor 6 can capture an image of the workpiece W. In the present embodiment, the range sensor 6 is disposed above the container 9. The range sensor 6 is fixed to a support member 83. The range sensor 6 is controlled by the controller 4.

The range sensor 6 of the present embodiment is a stereo camera that includes two cameras 61 and 62. The two cameras 61 and 62 are arranged to be mutually separated. The cameras 61 and 62 are two-dimensional cameras that can capture two-dimensional images. Any camera that is provided with an image element such as a charge-coupled device (CCD) sensor, or a complementary metal-oxide semiconductor (CMOS) sensor, or the like can be used as the cameras 61 and 62. Relative positions of the two cameras 61 and 62 are determined in advance. The range sensor 6 of the present embodiment includes a projector 63 that projects pattern light such as a stripe pattern toward the workpiece W.

Figure 2:
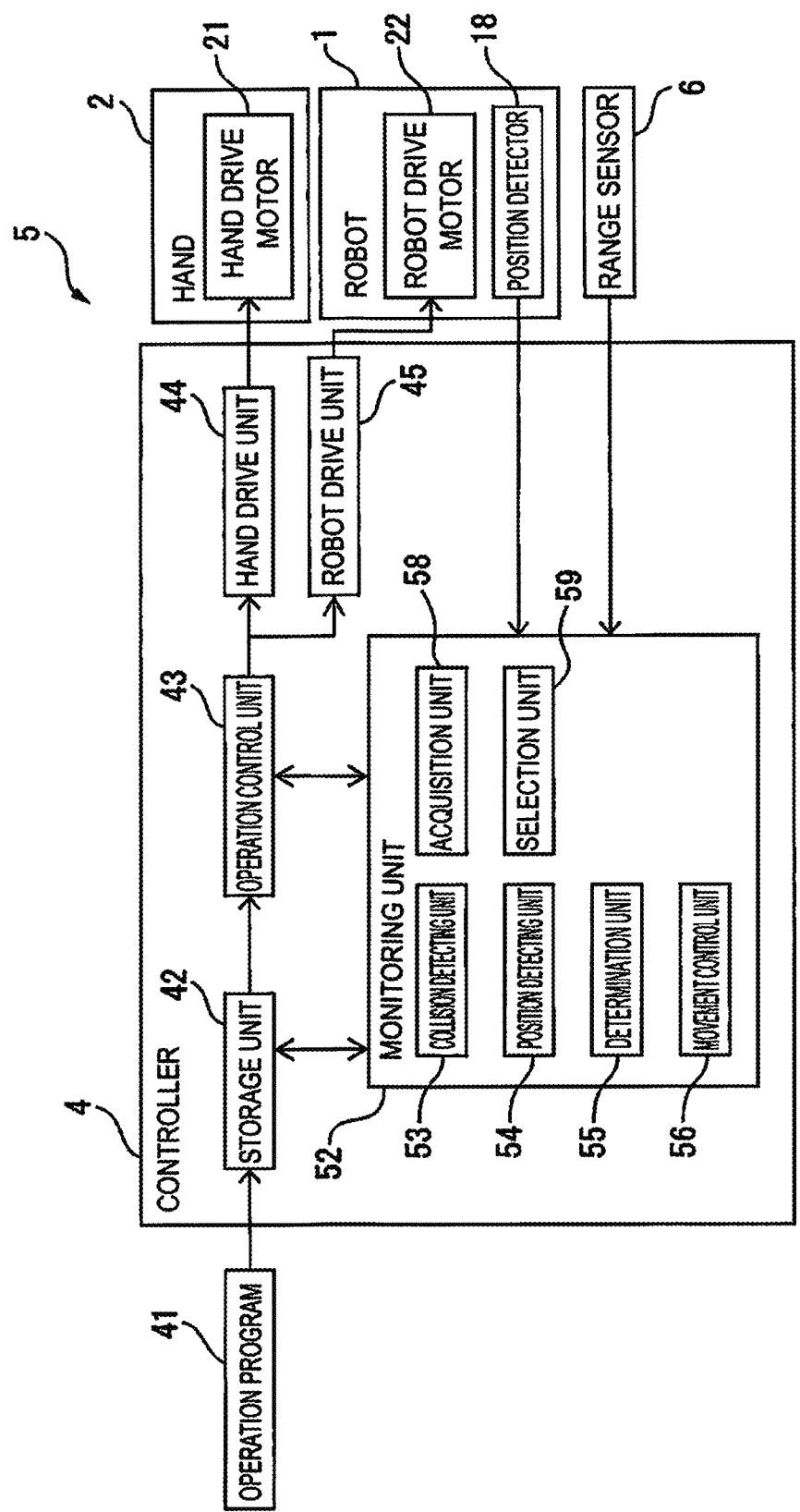
FIG. 2 is a block diagram of the robot system of the embodiment.

FIG. 2 is a block diagram of a robot system of the present embodiment. With reference to FIG. 1 and FIG. 2, the robot 1 includes a robot drive device that changes the position and orientation of the robot 1. The robot drive device includes robot drive motors 22 that drive structural members such as an arm and a wrist. Each of the robot drive motors 22 is driven, whereby the position and orientation of each of the structural members changes.

The robot system 5 is provided with a hand drive device that drives the hand 2. The hand drive device includes a hand drive motor 21 that drives the claw parts 3 of the hand 2. The hand drive motor 21 is driven, whereby the claw parts 3 of the hand 2 open and close. Note that the hand may be formed to be driven by air pressure, or the like.

The controller 4 includes an arithmetic processing device (a computer) having a Central Processing Unit (CPU), a Random Access Memory (RAM), a Read Only Memory (ROM), and the like that are connected to the CPU via a bus.

An operation program 41 that is created in advance for performing operations of the robot 1 is input into the controller 4. The operation program 41 is stored in a storage unit 42. Further, the storage unit 42 stores information relating to control of the robot system 5, such as determination ranges, determination values, and the like. The robot system 5 of the present embodiment transports the workpiece W on the basis of the operation program 41. The robot 1 can automatically transport the workpiece W to the predetermined position.

An operation control unit 43 transmits, to a robot drive unit 45, an operation command for driving the robot 1 on the basis of the operation program 41. The robot drive unit 45 includes electrical circuits that drive the robot drive motor 22. The robot drive unit 45 supplies electricity to the robot drive motor 22 on the basis of the operation command.

Further, the operation control unit 43 transmits, to a hand drive unit 44, an operation command for driving the hand 2 on the basis of the operation program 41. The hand drive unit 44 includes electrical circuits that drive the hand drive motor 21. The hand drive unit 44 supplies electricity to the hand drive motor 21 on the basis of the operation command. Furthermore, the operation control unit 43 outputs, to the range sensor 6, an operation command for driving the range sensor 6 on the basis of the operation program 41.

The robot 1 includes a state detector for detecting the position and orientation of the robot 1. The state detector of the present embodiment includes a position detector 18 attached to the robot drive motor 22 in correspondence to the drive axis of the structural member such as the arm. An orientation of the structural member with respect to each of the drive axes can be acquired by an output of the position detector 18. For example, the position detector 18 detects a rotation angle when the robot drive motor 22 is driven. Further, the position detector 18 can calculate a rotation speed of the robot drive motor 22 on the basis of the rotation angle of the robot drive motor 22. On the basis of the output of the position detector 18, the position and orientation of the hand 2 are detected.

The controller 4 includes a monitoring unit 52 that monitors the operation of the robot 1 on the basis of the operation program 41. The monitoring unit 52 controls the operation of the robot 1 under a predetermined condition. The monitoring unit 52 of the present embodiment performs control for selecting the workpiece W to be taken out from the container 9, and for gripping the workpiece W by the hand 2. Further, the monitoring unit 52 performs control for detecting that the hand 2 has collided with the workpiece W, and for moving the workpiece W inside the container 9.

The controller 4 includes an acquisition unit 58 that acquires three-dimensional information of the workpiece W on the basis of an output of the range sensor 6. The acquisition unit 58 processes the images captured by the cameras 61 and 62. The acquisition unit 58 can generate the three-dimensional information of the workpiece W by using the stereo method. The acquisition unit 58 calculates a distance to a measurement point set on the workpiece W, on the basis of parallax between two images captured by the two cameras 61 and 62. Note that, an arithmetic processing device that processes the images acquired by the cameras 61 and 62 may be arranged separately from the controller 4.

The three-dimensional information includes information about the position of the measurement point set on the surface of the workpiece W, and information about the distance to the measurement point from the range sensor 6. The three-dimensional information is, for example, a distance image or a three-dimensional map. The distance image is an image in which the brightness or colors of pixels of the image are changed in accordance with the distance. The three-dimensional map includes information about coordinate values of a predetermined coordinate system, and distances relating to a plurality of the measurement points.

The monitoring unit 52 includes a selection unit 59 that selects the target workpiece W to be taken out by the robot 1. The selection unit 59 selects the target workpiece W on the basis of the three-dimensional information acquired from the image of the range sensor 6. The selection unit 59 detects the position and orientation of the workpiece W on the basis of the three-dimensional information. The selection unit 59 can select the target workpiece W by any control. For example, the workpiece W closest to the range sensor 6 can be set as the target workpiece W. In other words, the workpieces W can be selected in order from the workpiece W in a higher position. Alternatively, in the predetermined conditions, the workpiece W in a lower position may be selected. For example, the selection unit 59 may select the workpiece W for which a part that can be gripped by the hand is significantly exposed, and can be easily gripped.

Further, the selection unit 59 may determine whether or not the operation for gripping the workpiece W by the hand 2 is possible. For example, when the workpiece W is near to a wall face of the container 9, the claw parts 3 of the hand 2 may not be able to be arranged to the side of the workpiece W. In such case, the selection unit 59 may determine that the operation for gripping the workpiece W is not possible.

Then, the selection unit 59 calculates a target position and a target orientation at which the robot 1 can grip the workpiece W in accordance with the position and orientation of the target workpiece W. The selection unit 59 transmits, to the operation control unit 43, the target position and the target orientation of the robot 1. The robot 1 changes its position and orientation toward the target position and the target orientation. At this time, the hand 2 opens the claw parts 3 such that the workpiece W is arranged between the claw parts 3. After the robot 1 has reached the target position and the target orientation, the workpiece W can be gripped by closing the claw parts 3 of the hand 2. Next, the operation control unit 43 changes the position and orientation of the robot 1, and transports the workpiece W to a desired position.

In this way, the robot system 5 of the present embodiment can transport each of the workpieces W loaded in bulk, on the basis of the three-dimensional information of the workpiece W acquired on the basis of the output of the range sensor 6.

Figure 3:
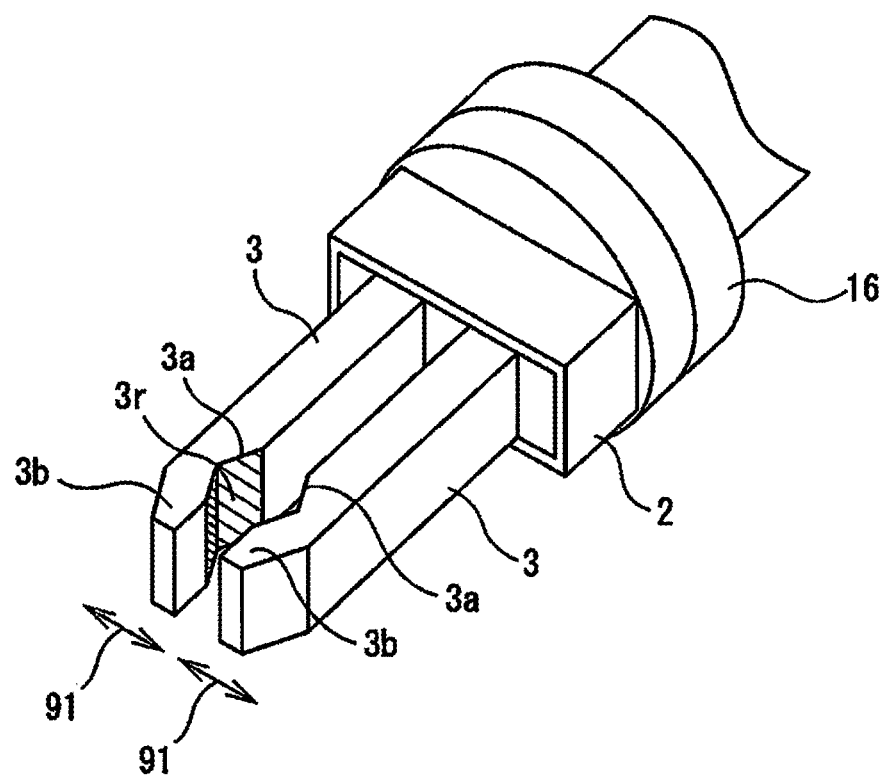
FIG. 3 is an enlarged perspective view of a hand of the embodiment.

FIG. 3 is a perspective view of the hand of the present embodiment. The workpiece W of the present embodiment has a columnar shape. In particular, the workpiece W of the present embodiment has a cylindrical shape. As indicated by arrows 91, the claw parts 3 of the hand 2 move in mutually opposing directions. Each of the claw parts 3 of the present embodiment has a recess 3*a*. The recesses 3*a* are formed in the surfaces that oppose each other in the plurality of claw parts 3. Each of the recesses 3*a* is formed to be recessed from the surface of the claw part 3, which is formed in a flat plane shape. The recesses 3*a* formed in the two claw parts 3 are formed so as to oppose each other.

Each of the claw parts 3 of the present embodiment has a grip region that has a shape for gripping the workpiece W. In the present embodiment, the hand 2 is formed so as to clamp the workpiece W by the mutually opposing recesses 3*a*. The surface of each of the recesses 3*a* corresponds to a grip region 3*r*. The workpiece W is gripped such that an axial direction of the workpiece W extends in a direction perpendicular to a direction in which the claw parts 3 move. By clamping the workpiece W in the grip regions 3*r*, the workpiece W can be gripped in a stable manner. The grip region 3*r* is a region that comes into contact with at least a part of the workpiece W. The grip region can have any shape that allows the workpiece W to be gripped. For example, the grip region may have a shape that corresponds to the shape of the surface of the workpiece and may have surface contact with the surface of the workpiece.

Each of the claw parts 3 has a tip part 3*b* that is a part of leading end. Each of the tip parts 3*b* is arranged further to the leading end side of the claw part 3 than the recess 3*a*. The surfaces of the tip parts 3*b* that are opposed to each other in the present embodiment are formed in a flat plane shape.

Figure 4:
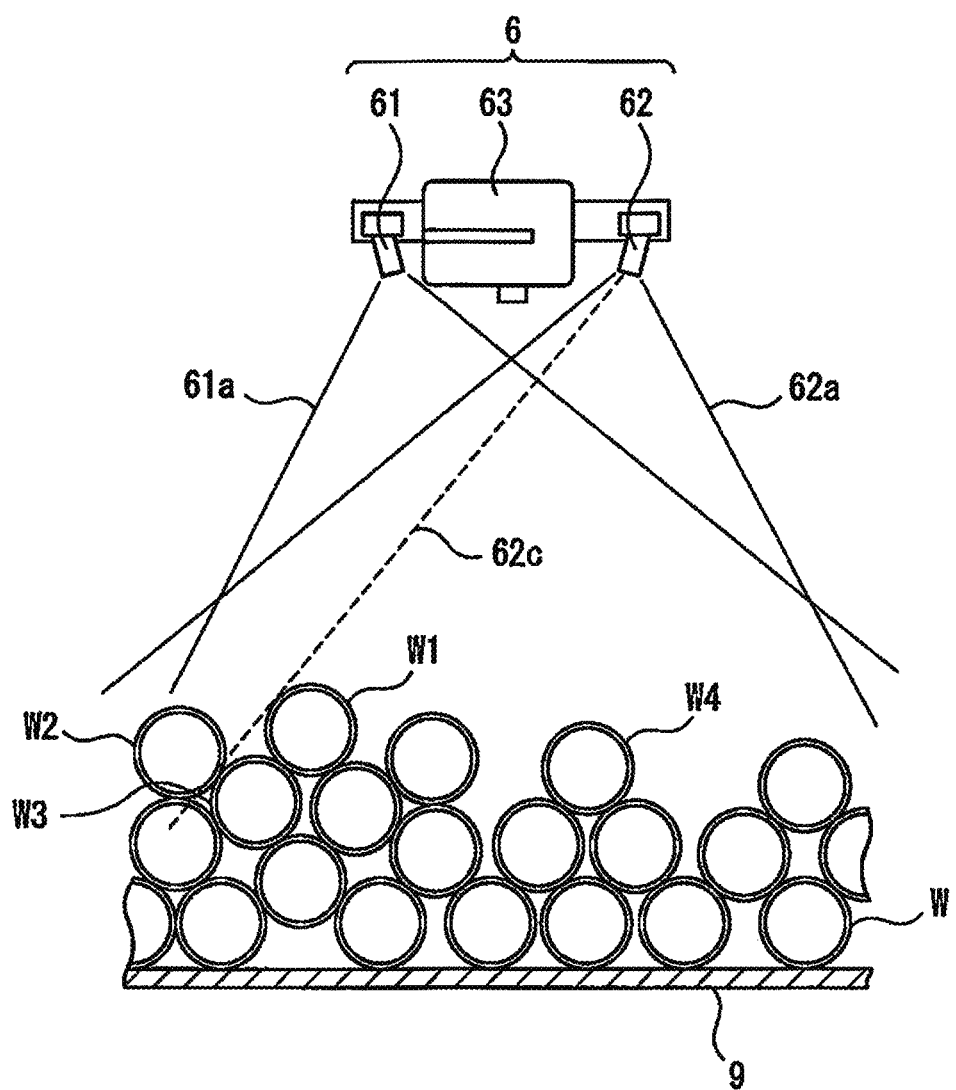
FIG. 4 is a partial cross-sectional view of a range sensor and the workpieces of the embodiment.

FIG. 4 is a partial cross-sectional view illustrating a relationship between the range sensor of the present embodiment and the workpiece. In FIG. 4, for explanatory purposes, a distance between the range sensor 6 and the container 9 is depicted to be short. A plurality of workpieces W, W1, W2, W3, and W4 are arranged inside the container 9. In the present embodiment, a state in which intervals between the workpieces W or the orientations of the workpieces W are not the same in at least one direction of the container 9, is referred to as a state of being loaded in bulk. In the present embodiment, the plurality of the workpieces W are arranged in the container 9 such that axis lines of the workpieces W (the direction in which the workpieces W extend) are parallel to each other. However, in a direction perpendicular to the axis lines of the workpieces W, intervals between the workpieces W are not uniform, and thus, this is the state of being loaded in bulk. Note that the state of being loaded in bulk may be a state in which the orientations of the plurality of workpieces are irregular.

The camera 61 of the range sensor 6 has a field of view 61*a*, which is a range over which an image can be captured. The camera 62 has a field of view 62*a* which is a range over which image can be captured. The cameras 61 and 62 are preferably arranged such that the container 9 is contained within the fields of view 61*a* and 62*a*. In other words, the cameras 61 and 62 are preferably arranged such that the image can be captured for all the workpieces that can be viewed from above the container 9.

Figure 5:
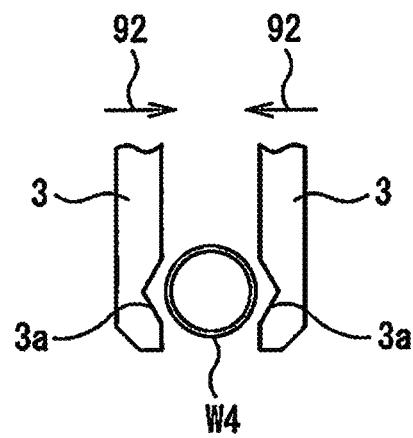
FIG. 5 is a schematic side view of a first step when the workpiece is gripped by grip regions of the hand.

FIG. 5 is an explanatory view of a first step when the workpiece is gripped by the grip regions of the hand. With reference to FIG. 4 and FIG. 5, in this example, the selection unit 59 selects the workpiece W4 from among the plurality of workpieces W. The workpiece W4 is arranged on the uppermost layer of the layers that are loaded in bulk. In a state illustrated in FIG. 5, the robot 1 has reached the target position and the target orientation for gripping the workpiece W. The workpiece W4 is arranged between the recesses 3*a* of the claw parts 3. In other words, the position and orientation of the robot 1 are controlled such that the workpiece W4 is arranged in a region between the grip regions 3*r*. Then, the claw parts 3 are closed as indicated by arrows 92.

Figure 6:
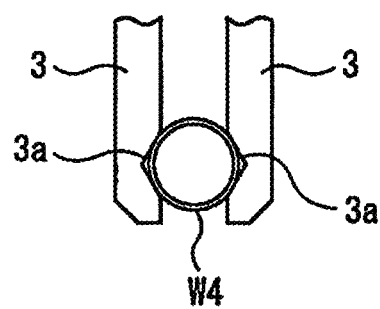
FIG. 6 is a schematic side view of a second step when the workpiece is gripped by the grip regions of the hand.

FIG. 6 is an explanatory view of a second step when the workpiece is gripped by the grip regions of the hand. The workpiece W4 is clamped in the recesses 3*a* by the closing of the claw parts 3. By clamping the workpiece W4 in the grip regions 3*r* of the claw parts 3, the workpiece W4 can be gripped in a stable manner. The workpiece W4 can be transported in the stable manner without the workpiece W4 falling from the hand 2 during the period in which the workpiece W4 is being transported.

Figure 7:
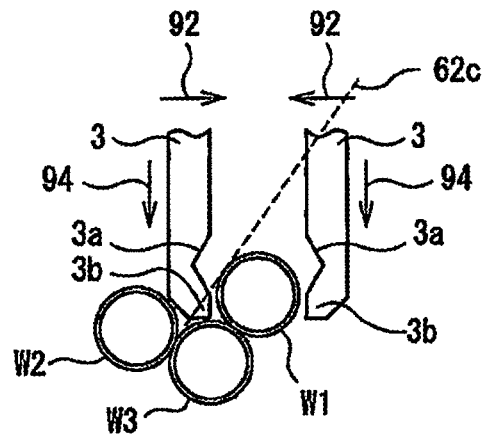
FIG. 7 is a schematic side view illustrating a first step of a first control of the embodiment.

FIG. 7 is a schematic side view illustrating a first step of a first control of the present embodiment. Referring to FIG.

4 and FIG. 7, the focus will be on the workpiece W1. The workpiece W1 is arranged on the uppermost layer of the pile that is loaded in bulk. The workpiece W3 is arranged below the workpiece W1. Further, the workpiece W2 is arranged beside the workpiece W1. Here, the workpiece W3 is arranged within the fields of view 61a and 62a. However, in the direction of a line of sight 62c of the camera 62, the workpiece W1 is arranged in front of the workpiece W3. The workpiece W3 enters into a dead angle of the workpiece W1. Thus, the camera 62 cannot capture an image of the workpiece W3. As a result of this, the workpiece W3 is not present in the three-dimensional information generated by the acquisition unit 58. Since the selection unit 59 performs the process on the assumption that the workpiece W3 is not present, it may be determined that the workpiece W1 can be taken out. As a result of this, the selection unit 59 may select the workpiece W1 as the workpiece to be taken out by the robot 1.

As illustrated in FIG. 7, during the period in which the robot 1 is moving toward the target position and the target orientation for gripping the workpiece W1, the claw part 3 of the hand 2 may collide with the workpiece W3. The robot 1 may not be able to move the hand 2 to the target position and the target orientation for gripping the workpiece W1.

With reference to FIG. 2, the monitoring unit 52 has the collision detecting unit 53 for stopping the robot 1 in response to the hand 2 colliding with the workpiece W. With reference to FIG. 2 and FIG. 7, the collision detecting unit 53 detects that the hand 2 has collided with the workpiece during the period in which the robot 1 is moving to the target position and target orientation, from the position and orientation before movement. The collision detecting unit 53 of the present embodiment performs control for stopping the robot 1 when the hand 2 has collided with the workpiece W3.

The collision detecting unit 53 can detect that the hand 2 has collided with the workpiece W by any control. For example, the collision detecting unit 53 can detect the collision on the basis of a disturbance value of the robot drive motor 22. Alternatively, the operation control unit 43 may perform feedback control of the robot drive motor 22 in order to drive the robot 1 to the target position and the target orientation. In this case, the collision detecting unit 53 can determine that the hand 2 has collided with the workpiece W when an amount of increase in an electric current supplied to the robot drive motor 22 exceeds a predetermined determination value.

Alternatively, a distance sensor can be arranged on the hand. The collision detecting unit may detect that the hand has collided with the workpiece by acquiring a distance between the hand and the workpiece. Alternatively, a contact sensor can be arranged at the leading end of the hand. The collision detecting unit may detect that the hand has come into contact with the workpiece on the basis of an output of the contact sensor. Alternatively, a force sensor can be arranged on the wrist. The collision detecting unit may determine that the hand has come into contact with the workpiece when a force acting on the hand detected by the force sensor becomes greater than a predetermined determination value.

The monitoring unit 52 includes a position detecting unit 54 that detects a stop position and a stop orientation of the robot 1 stopped by the collision detecting unit 53. The position detecting unit 54 detects the stop position and the stop orientation of the robot 1 on the basis of the outputs of the position detectors 18.

With reference to FIG. 2 and FIG. 7, by the function of the collision detecting unit 53, the robot 1 stops when at least one of the claw parts 3 has collided with the workpiece. In this state, even when the claw parts 3 are closed, the workpiece W1 cannot be gripped by the recesses 3a. In other words, the hand 2 cannot reliably grip the workpiece W. However, in the first control of the present embodiment, when the target workpiece W1 can be gripped by a part other than the grip regions 3r in which the recesses 3a are formed (by non-grip regions), the workpiece W1 is gripped. Then, control is performed so as to move the workpiece W1 inside the container 9.

The monitoring unit 52 includes a determination unit 55 that determines, on the basis of the target position and the stop position of the robot 1, whether or not the target workpiece W1 can be gripped by the part other than the grip regions 3r of the hand 2. The determination unit 55 of the present embodiment determines whether or not the workpiece W1 can be gripped by the tip parts 3b of the claw parts 3. In the example illustrated here, the determination unit 55 determines that the workpiece W1 can be gripped by the tip parts 3b of the claw parts 3.

Figure 8:
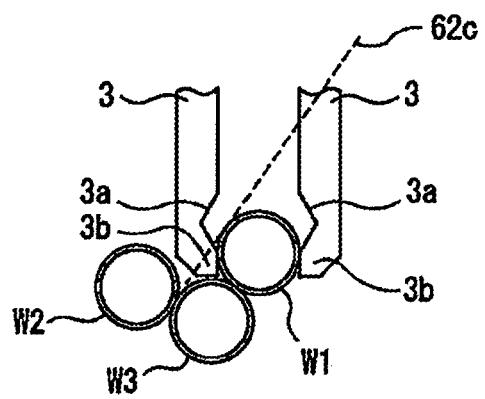
FIG. 8 is a schematic side view illustrating a second step of the first control of the embodiment.

FIG. 8 is a side view illustrating a second step of the first control of the present embodiment. With reference to FIG. 2, FIG. 7, and FIG. 8, the monitoring unit 52 includes a movement control unit 56 that controls the robot 1 so as to move the workpiece W1 inside the container 9. When the determination unit 55 determines that the workpiece W1 can be gripped, the movement control unit 56 closes the claw parts 3 as indicated by the arrows 92. The workpiece W1 is gripped by the tip parts 3b.

Figure 9:
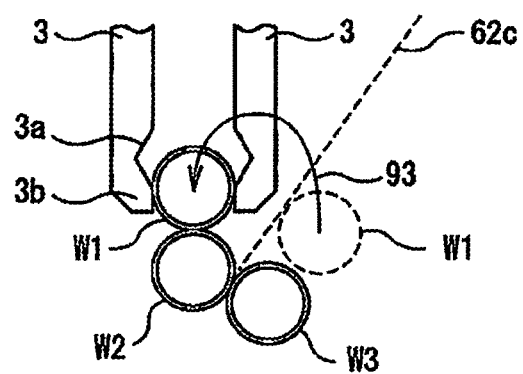
FIG. 9 is a schematic side view illustrating a third step of the first control of the embodiment.

FIG. 9 is a side view illustrating a third step of the first control of the present embodiment. The movement control unit 56 controls the robot 1 so as to lift the workpiece W1 as indicated by an arrow 93, and move the workpiece W1 to another position inside the container 9. By moving the workpiece W1, the position of the workpiece W1 inside the container 9 is changed. Sometimes, the workpiece W1 changes to a state in which it can be gripped by the grip regions 3r of the hand 2. Thus, the operation for taking out the workpiece W1 can be attempted at the new position and orientation of the workpiece W1.

Further, the positions and orientations (a loading state) of the plurality of workpieces W in a plan view of the container 9 can sometimes be changed. For example, in the example illustrated in FIG. 9, when the hand 2 releases the workpiece W1 directly above the workpiece W2, the positions and orientations of the workpiece W2 and the workpiece W3 may change. Alternatively, when the workpiece W1 is moved, the load collapse may occur and the positions and orientations of the plurality of workpieces W may change. Further, a state may be obtained in which the workpiece W arranged directly below the workpiece W1 can be gripped. In this way, since the positions and orientations of the workpieces W can be changed, the opportunities to attempt the operation for taking out the workpiece W increase, and more of the workpieces W can be taken out from the container 9.

As illustrated in FIG. 9, when the workpiece W1 is being gripped by the tip parts 3b of the claw parts 3, the gripping is in an unstable state. When the workpiece W1 is gripped by the part other than the grip regions 3r, the workpiece W1 may fall from the claw parts 3 while the workpiece W1 is being transported. However, even in a case where the workpiece W1 falls, the position and orientation of the workpiece W1 may change, the load collapse may occur inside the container 9, and the like. Thus, the operation for taking out the workpiece W1 can be attempted in the state in which the position and orientation of the workpiece W1 have changed.

After the first control, the robot system 5 uses the range sensor 6 so as to capture the image in a state after the positions of the workpieces W have changed. Then, the operation for taking out the workpiece W can be performed on the basis of the newly acquired three-dimensional information.

Figure 10:
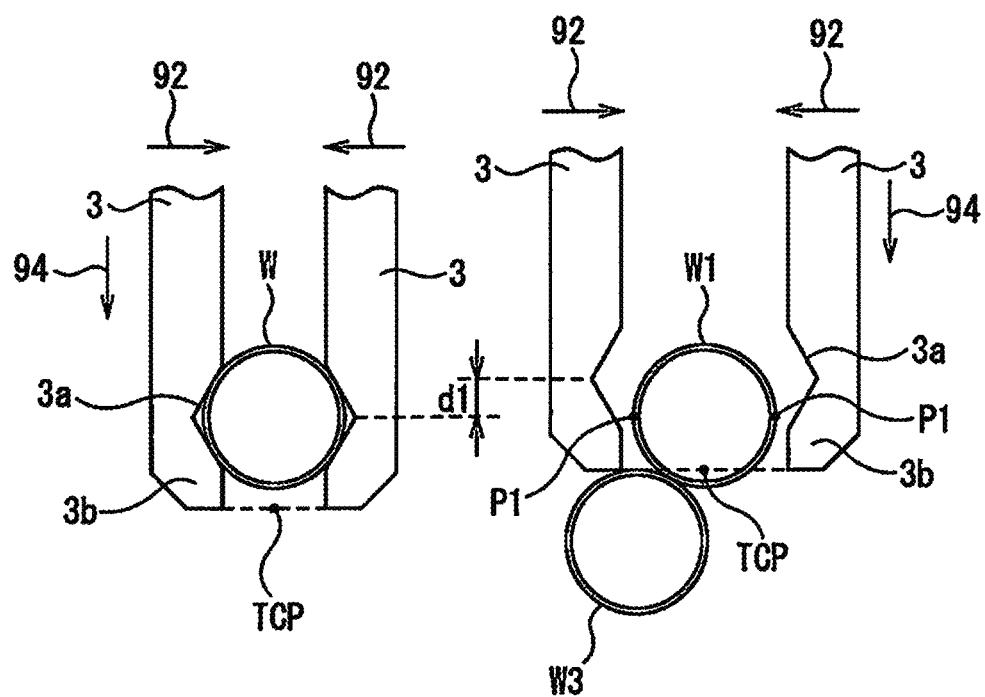
FIG. 10 is schematic side view illustrating a determination range for determining whether or not the workpiece can be gripped by a part other than the grip regions.

FIG. 10 shows a side view of the workpiece and the claw parts for illustrating a determination range used when the determination unit performs the determination in the first control. Arrows 94 indicate a movement direction of the hand 2 when the robot 1 reaches the target position and target orientation. The diagram on the left side of FIG. 10 is a diagram when the workpiece W is gripped by the grip regions 3r of the recesses 3a in the claw parts 3. The robot 1 has reached the target position and the target orientation. Thus, the workpiece W can be gripped by the recesses 3a.

Meanwhile, the diagram on the right side of FIG. 10 illustrates an example in which the claw part 3 collides with the workpiece W3 while the hand 2 is moving. In this case, the robot 1 is stopped by the function of the collision detecting unit 53. The position and orientation of the robot 1 at that time are the stop position and the stop orientation, respectively. The determination unit 55 calculates a difference d1 between the target position and the stop position in the travel direction of the claw parts 3 indicated by the arrows 94. A difference between the target position and the stop position of the hand 2 can be used as the difference between the target position and the stop position of the robot 1. In the example illustrated in FIG. 10, the determination unit 55 detects, as the difference d1, a distance between apexes of the recesses 3a in the direction indicated by the arrows 94. The position of the hand can be expressed by using coordinates of a predetermined coordinate system. For example, the position of the hand can be expressed by using coordinate values of a world coordinate system for which the position of an origin does not change even if the position and orientation of the robot change. The determination unit 55 can calculate the difference d1 on the basis of the coordinate values.

The determination unit 55 determines that the workpiece W1 can be gripped by the tip parts 3b when the difference d1 is within a predetermined determination range. For example, a lower limit value of the determination range can be set as a value that is slightly higher than zero. Further, a point P1 that is an intersection point of a diameter of the workpiece W1 parallel to a direction in which the claw parts 3 are moving as indicated by the arrows 92 with the surface of the workpiece W1 can be calculated. An upper limit value of the determination range can be set as a maximum value, of values when the point P1 comes into contact with the surface of the tip part 3b when the claw parts 3 are closed. The determination unit 55 determines that the workpiece W1 cannot be gripped by the tip parts 3b of the claw parts 3 when the difference d1 is greater than the predetermined determination range.

Note that any position in the hand 2 can be used when the difference between the target position and the stop position is detected. For example, the determination unit 55 may calculate a distance between each of the tool tip part points TCP of the hand 2.

Figure 11:
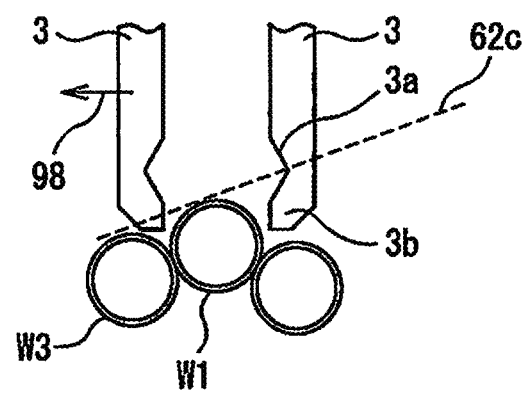
FIG. 11 is a schematic side view illustrating a first step of a second control of the embodiment.

Next, a second control of the present embodiment will be explained. FIG. 11 is a side view illustrating a first step of the second control of the present embodiment. In the example illustrated here, the second control is performed when the determination unit 55 determines that the target workpiece W cannot be gripped by the part other than the grip regions 3r of the hand 2. With reference to FIG. 2 and FIG. 11, in the second control, the determination unit 55 determines whether or not the workpiece W1 can be pressed by the claw parts 3. In other words, the determination unit 55 determines whether or not the claw parts 3 come into contact with the workpiece W1 when the claw parts 3 are moved in the horizontal direction while not driving the claw parts 3 and maintaining an open state thereof. In the example illustrated in FIG. 11, the determination unit 55 determines that an upper part of the workpiece W1 can be pressed by the claw parts 3.

When the determination unit 55 determines that the workpiece W1 can be pressed by the claw parts, the movement control unit 56 does not drive the claw parts 3 and maintains the open state thereof. Then, the movement control unit 56 controls the robot 1 so as to move the hand 2 and press the workpiece W by the hand 2. The movement control unit 56 moves the hand 2 in the horizontal direction, as indicated by an arrow 98.

Figure 12:
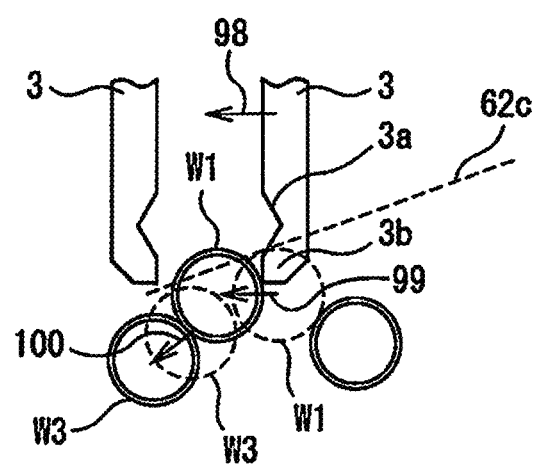
FIG. 12 is a schematic side view illustrating a second step of the second control of the embodiment.

FIG. 12 is a side view illustrating a second step of the second control of the present embodiment. When the claw parts 3 of the hand 2 move as indicated by the arrow 98, the workpiece W1 can be pressed by the tip parts 3b of the claw parts 3. When the workpiece W1 is moved as indicated by an arrow 99, the position of the workpiece W1 changes. Further, the positions and orientations of the plurality of workpieces in a plan view may sometimes change. In the example illustrated in FIG. 12, the position of the workpiece W3 changes as indicated by an arrow 100.

Even in the second control, the position and orientation of the workpiece W1 may change, the load collapse may occur inside the container 9, and the like. Thus, the operation for taking out the workpiece W can be attempted in a state in which the position and orientation of the workpiece W have changed. The opportunities for taking out the workpiece increase, whereby a lot of the workpieces can be taken out.

After the second control has been performed, the range sensor 6 is used to acquire the new three-dimensional information of the workpiece W. Then, the control for taking out the workpiece W can be continued.

Figure 13:
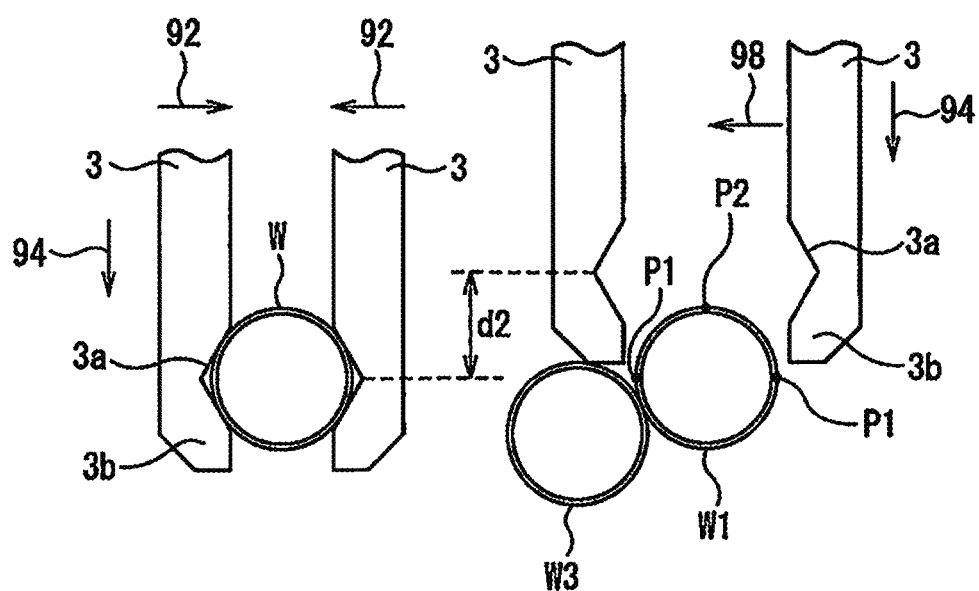
FIG. 13 is schematic side view illustrating a determination range for determining whether or not the workpiece can be pressed by the part other than the grip regions.

FIG. 13 is a schematic diagram illustrating a determination range of the second control. The diagram on the left side of FIG. 13 illustrates a state in which the robot 1 has reached the target position and the target orientation, and has gripped the workpiece W. The workpiece W is clamped by the recesses 3a that constitute the grip regions 3r.

The diagram on the right side of FIG. 13 is a diagram in which the claw part 3 has collided with the workpiece W3, and the robot 1 has stopped at the stop position and the stop orientation. The determination unit 55 can calculate a difference d2 between the target position and the stop position in the travel direction of the hand 2 as indicated by the arrows 94. The difference d2 is greater than the difference d1 illustrated in FIG. 10. The determination unit 55 can set the point P1 in the same way as the first control illustrated in FIG. 10. Further, the determination unit 55 can set a point P2 that is an intersection point of the diameter of the workpiece W1 perpendicular to the direction in which the claw parts 3 are moving as indicated by the arrows 92 with the surface of the workpiece W1. As the determination range of the second control, a range can be set as a range in which the tip parts 3b come into contact with a region from the point P1 to the point P2 of the workpiece W1 when the claw parts 3 move in the horizontal direction. In other words, the determination range is selected as a region in which the tip parts of the claw parts 3 come into contact with the upper portion of the workpiece W1 when the hand 2 moves in the horizontal direction. The determination unit 55 can determine that the workpiece W1 can be pressed by the hand 2 when the difference d2 is within the determination range.

Figure 14:
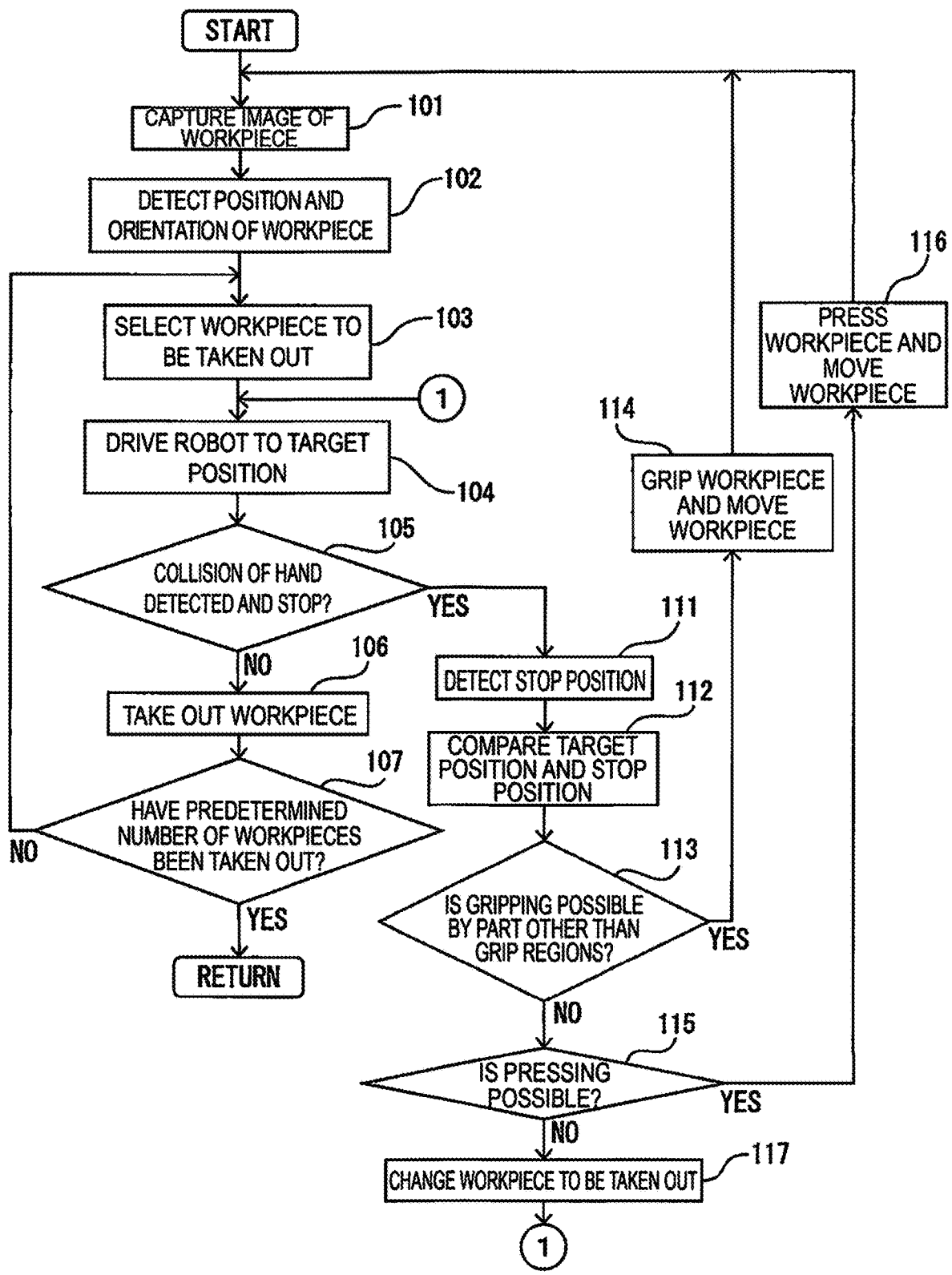
FIG. 14 is a flowchart of a control including the first control and the second control of the embodiment.

FIG. 14 is a flowchart of a control in which the second control is performed after the first control. With reference to FIG. 2 and FIG. 14, at step 101, the range sensor 6 performs an image capturing step for capturing an image of the workpiece W.

At step 102, the acquisition unit 58 performs an acquisition step for acquiring the three-dimensional information of the workpiece W on the basis of the output of the range sensor 6. The acquisition unit 58 generates the three-dimensional information of the workpiece on the basis of the distance from the range sensor 6 to the measurement point set on the surface of the workpiece W.

At step 103, the selection unit 59 performs a selection step for selecting the target workpiece W to be taken out by the robot 1, on the basis of the three-dimensional information of the workpiece. The selection unit 59 calculates the position and orientation of the workpiece W on the basis of the three-dimensional information. The selection unit 59 selects the target workpiece W on the basis of the position and orientation of the workpiece W. Then, the selection unit 59 sets the target position and the target orientation of the robot 1 on the basis of the position and orientation of the target workpiece W.

Next, at step 104, the operation control unit 43 performs a step for driving the robot 1 toward the target position and the target orientation. The position and orientation of the robot 1 are changed.

Next, at step 105, the collision detecting unit 53 determines whether or not the hand 2 has collided with the workpiece W during the period in which the robot 1 is moving to the target position and the target orientation for gripping the target workpiece W. The collision detecting unit 53 performs a stopping step for stopping the robot 1 when it is detected that the workpiece W has collided with the hand 2. At step 105, when the hand 2 has not collided with the workpiece W and has not stopped, the robot 1 reaches the target position and the target orientation. In this case, the control proceeds to step 106.

At step 106, the operation control unit 43 performs a take-out step for gripping the workpiece W by the hand 2, and taking out the workpiece W. In this case, the workpiece W is gripped by the grip regions of the hand 2 and transported to the predetermined position.

Next, at step 107, the monitoring unit 52 determines whether or not a predetermined number of the workpieces W have been taken out. A determination value of this number can be set as a desired number by an operator. At step 107, when the predetermined number of the workpieces W have been taken out, this control ends. At step 107, when the predetermined number of the workpieces W have not been taken out, the control proceeds to step 103. In other words, when the number of workpieces W taken out by the robot 1 is less than the predetermined determination value of the number, the control proceeds to step 103.

Then, at step 103, the selection unit 59 selects the workpiece W to be taken out next, on the basis of the three-dimensional information acquired in the previous acquisition process. Alternatively, the control may move from step 107 to step 101, and the control for taking out the workpiece may be performed from the step for capturing the image of the workpiece. In this way, the steps are performed in which the workpieces W to be taken out by the robot 1 are selected in order, and the workpieces W are taken out one by one.

When, at step 105, the collision detecting unit 53 detects the collision of the hand 2 and stops the hand 2, the control proceeds to step 111. The controller 4 performs the first control. At step 111, the position detecting unit 54 performs a detection step for detecting the stop position and the stop orientation when the robot 1 has stopped.

Next, the determination unit 55 performs a determination step for determining, on the basis of the target position and the stop position of the robot 1, whether or not the target workpiece W can be gripped by the part other than the grip regions 3r of the hand 2. At step 112, the determination unit 55 compares the stop position and the target position. At step 113, the determination unit 55 determines whether or not the workpiece W can be gripped by the part other than the recesses 3a when the claw parts 3 are closed at the current position and orientation of the hand 2. When, at step 113, it is determined that the tip parts 3b of the claw parts 3 can grip the workpiece W, the control proceeds to step 114.

At step 114, the movement control unit 56 performs a movement step for controlling the robot 1 so as to move the workpiece W inside the container 9. The movement control unit 56 performs a step for gripping the workpiece W by the tip parts 3b of the claw parts 3. The movement control unit 56 performs a step for releasing the workpiece W after moving the target workpiece W. As a result of this, the position of the workpiece inside the container 9 changes.

After this, the control returns to step 101, and performs the image capture step for capturing an image of the workpiece W again by using the range sensor 6. Then, the controller 4 continues the control for taking out the workpieces W.

When, at step 113, the determination unit 55 determines that the workpiece W cannot be gripped by the part other than the grip regions 3r, the control proceeds to step 115. In this case, the controller 4 performs the second control. At step 115, the determination unit 55 performs a determination step for determining whether or not the target workpiece can be pressed by the part other than the grip regions 3r of the hand 2. In the present embodiment, the determination unit 55 determines whether or not the target workpiece W can be pressed by the claw parts 3.

When, at step 115, it is determined that the workpiece can be pressed, the control proceeds to step 116. At step 116, the movement control unit 56 performs a movement step for moving the hand 2 in the horizontal direction, while not driving the claw parts 3 and maintaining the open state thereof. The movement control unit 56 controls the robot 1 so as to press the workpiece W by the hand 2.

After this, the control returns to step 101, and performs the image capture step for capturing an image of the workpiece W again by using the range sensor 6. Then, the controller 4 continues the control for taking out the workpieces W.

When, at step 115, the determination unit 55 determines that the target workpiece W cannot be pressed, the control proceeds to step 117. In other words, when the target workpiece W cannot be gripped by the tip parts 3b of the claw parts 3, and further, the claw parts 3 do not come into contact with the workpiece W even in a case where the claw parts 3 move in the horizontal direction, the control proceeds to step 117. At step 117, the selection unit 59 performs a change step for changing the target workpiece W. In other words, the operation for taking out the current target workpiece is paused, and another of the workpieces W is set as the target workpiece. The selection unit 59 selects the new workpiece W on the basis of the current three-dimensional information. The selection unit 59 sets the target position and the target orientation of the robot 1 on the basis of the position and orientation of the new workpiece W. After this, the control proceeds to step 104. The controller 4 continues the control for taking out the workpieces W.

For example, in the control illustrated in FIG. 14, the determination value of the number of pieces at step 107 can be set as 5 pieces or the like, and the control can be repeatedly performed. Alternatively, the predetermined determination value of the number of pieces at step 107 can be set as the total number of workpieces W stored in the container 9.

Figure 15:
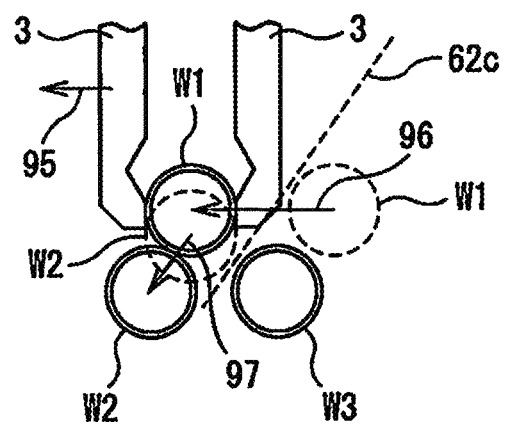
FIG. 15 is a schematic side view illustrating another aspect when the workpiece is gripped by tip parts of the claw parts and moved.

FIG. 15 is a side view illustrating another method of moving the workpiece in the first control when the workpiece is gripped by the part other than the grip regions. In the control illustrated in FIG. 9, after the workpiece W is gripped by the tip parts 3b of the claw parts 3, the workpiece W is lifted and moved. The movement method of the workpiece W is not limited to this embodiment, and any method can be used for the movement. In the example illustrated in FIG. 15, after the target workpiece W1 has been gripped by the hand 2, the movement control unit 56 controls the robot 1 so as to move the target workpiece W1 in the horizontal direction without lifting the target workpiece W1. In other words, after gripping the workpiece W1, the workpiece W1 is moved while maintaining a height of the workpiece W1, as indicated by an arrow 95.

Even according to this movement method, the position of the workpiece W1 can be changed as indicated by an arrow 96. Further, in the example illustrated in FIG. 15, by moving the workpiece W1, the position of the workpiece W2 changes as indicated by an arrow 97. In this way, there is a case in which the position and orientation of the workpiece W2 other than the target workpiece W1 can be changed. Even in this movement method, the position and orientation of the workpiece in a plan view can be changed.

In the above-described control that is illustrated in FIG. 14, both the first control and the second control of the present embodiment are performed. The control method of the robot system is not limited to this embodiment, and only one of the first control and the second control may be performed. For example, when only the first control is performed, step 115 and step 116 can be omitted. At step 113, when it is determined that the workpiece cannot be gripped by the part other than the grip regions, the control can proceed to step 117.

Figure 16:
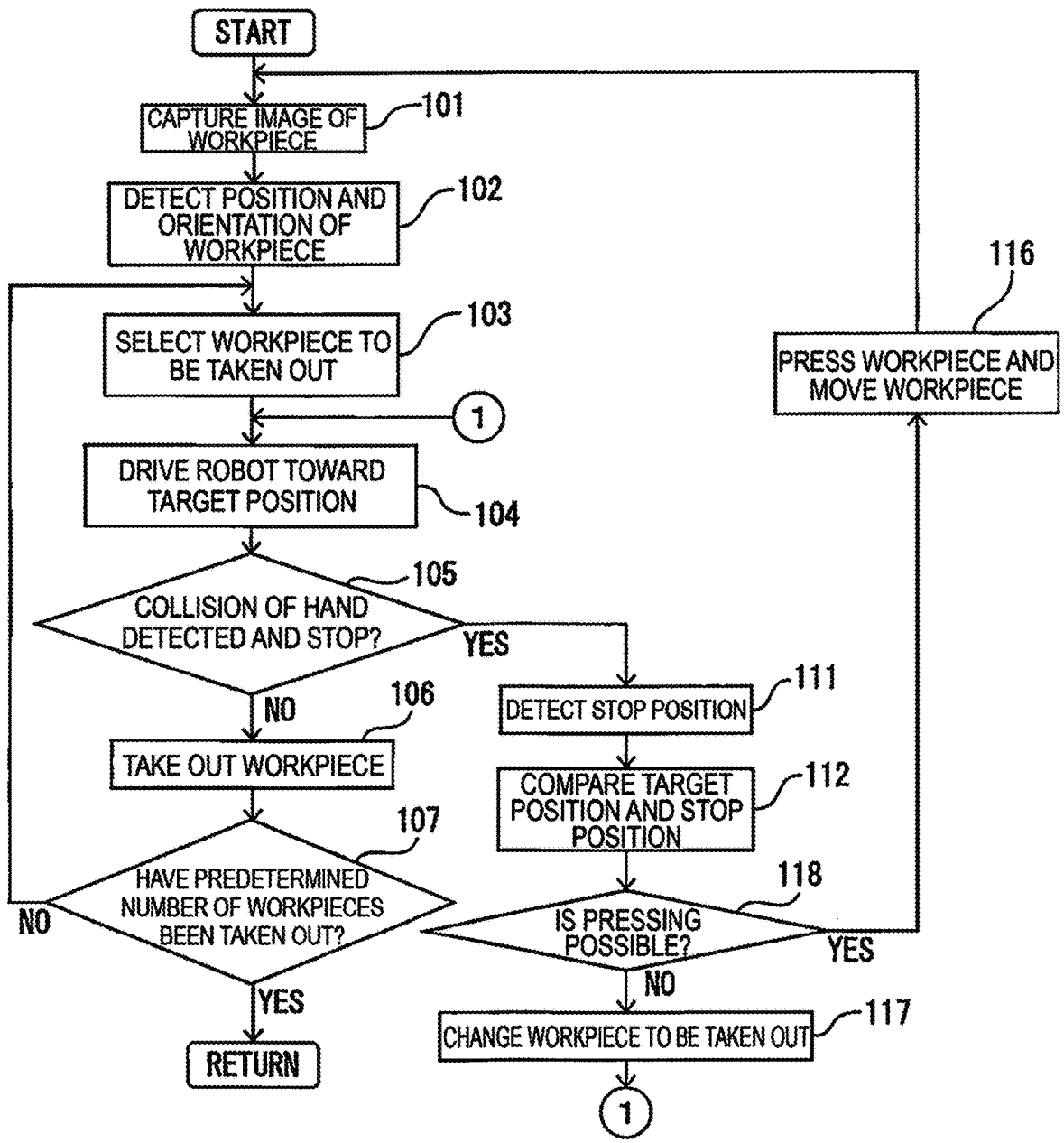
FIG. 16 is a flowchart of a control of the embodiment in which the second control is performed without performing the first control.

FIG. 16 is a flowchart of a control in which the second control is performed without performing the first control. In this case, in the second control, the determination range for determining whether or not the workpiece can be pressed becomes greater. The control from step 101 to step 107, and the control from step 111 to step 112 is the same as the control illustrated in FIG. 14. At step 118, the determination unit 55 performs a determination step for determining, on the basis of the target position and the stop position of the robot 1, whether or not the target workpiece W can be pressed by the part other than the grip regions 3r of the hand 2.

The determination unit 55 determines whether or not the tip parts 3b come into contact with the workpiece W when the tip parts 3b of the claw parts 3 are moved in the horizontal direction. With reference to FIG. 13, a lower limit value of the determination range of the difference d2 between the target position and the stop position in this case can be set as a value that is slightly higher than zero. An upper limit value of the determination range can be set as a maximum value of values obtained when the tip parts 3b come into contact with the region from the point P1 to the point P2, when the hand 2 moves in the horizontal direction. At step 118, when it is determined that the workpiece can be pressed by the part other than the grip regions 3r, the control proceeds to step 116.

At step 116, the movement control unit 56 performs a movement step for moving the hand 2 in the horizontal direction, while not driving the claw parts 3 and maintaining the open state thereof. Further, at step 118, when it is determined that the workpiece cannot be pressed by the part other than the grip regions 3r, the control proceeds to step 117. At step 117, the target workpiece is changed.

In this way, the second control can be performed without performing the first control. In this control also, when the workpiece cannot be gripped by the grip regions 3r of the hand 2, the operation for taking out the workpiece can be attempted after changing the position and orientation of the workpiece.

Figure 17:
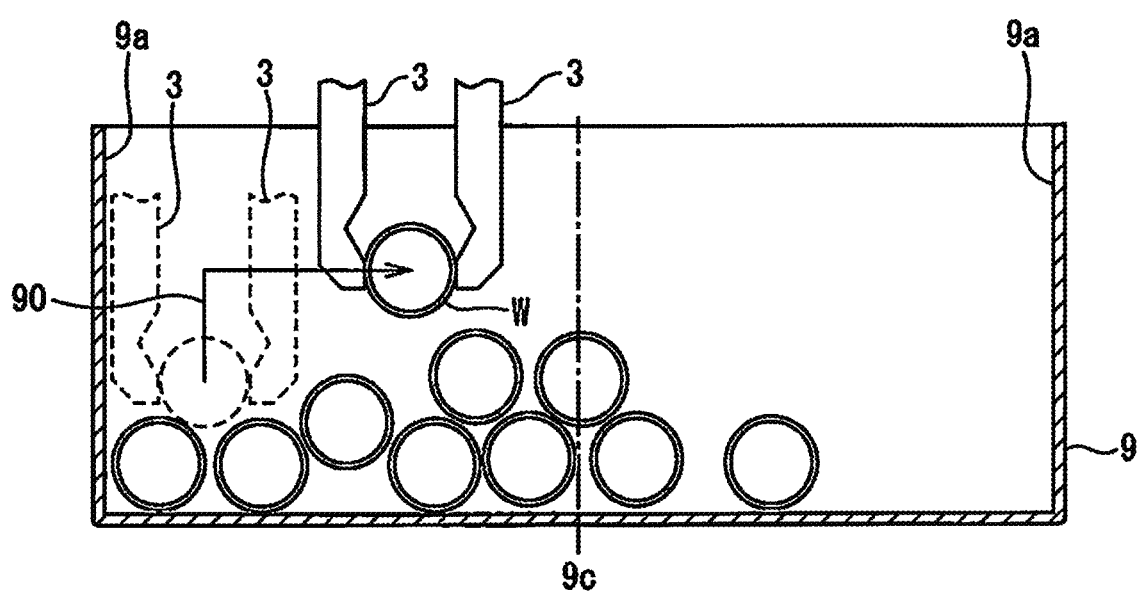
FIG. 17 is a partial cross-sectional view illustrating a direction in which the workpiece is moved.

FIG. 17 shows a schematic partial cross-sectional view of the container for illustrating a movement direction of the workpiece. In the above-described first control and second control, any direction can be employed as the direction in which the workpiece W is moved. In the example illustrated in FIG. 17, after gripping the workpiece W, the movement control unit 56 performs a step for moving the target workpiece W toward the center of the container 9 in a plan view of the container 9. The movement control unit 56 acquires the current position of the workpiece W and moves the workpiece W toward a center line 9c in the width direction of the container 9, as indicated by an arrow 90. Alternatively, the movement control unit 56 acquires the current position of the workpiece W, and identifies a wall part 9a that is closest to the current workpiece W. Then, the workpiece W1 can be moved in a direction separating from the wall part 9a that is closest to the workpieces W. As a result of this control, the workpieces W can be gathered in a central section of the container 9. When the robot 1 is driven toward the target position and the target orientation, it is possible to avoid interference between the hand 2 and the wall part 9a. In other words, it is possible to suppress the hand 2 from coming into contact with the wall part 9a and being unable to grip the workpiece W.

The movement control unit 56 can move the workpiece W by an arbitrary movement amount. A predetermined movement amount can be used as the movement amount of the workpiece W. Alternatively, the movement control unit 56 may perform control of the robot 1 so as to transport the workpiece W to a predetermined position in the vicinity of the center of the container 9.

In the example of the first control illustrated in FIG. 9, as indicated by the arrow 93, the workpiece W1 is moved on a curved movement trajectory, but the embodiment is not limited to this. As indicated by the arrow 90 in FIG. 17, the workpiece W may be moved in a straight line movement trajectory. In the example illustrated in FIG. 17, after the workpiece W has been lifted in the vertical direction, the movement control unit controls the robot 1 so as to move the workpiece W in the horizontal direction. Further, when the hand 2 releases the workpiece, the workpiece may be dropped by releasing the workpiece in a position separated from the workpiece that is arranged on the uppermost side. Alternatively, the workpiece may be released after placing the workpiece on the surface of the workpiece that is on the uppermost side of the workpieces loaded in the container 9.

The workpiece of the present embodiment has the cylindrical shape having a longitudinal direction. As a result, the plurality of workpieces are loaded such that the axial directions thereof are mutually parallel. Even when the workpiece is moved, the orientation of the workpiece is maintained. The shape of the workpiece is not limited to this example, and an arbitrary shape can be employed. Then, the control of the present embodiment can also be applied to a robot system for transporting the workpieces loaded such that the orientations of the workpieces are mutually different. In other words, the control of the present embodiment can also be applied to a robot system for taking out workpieces that are loaded such that the orientations of each of the workpieces are irregular. By moving the workpiece inside the container, at least one of the position and orientation of the workpiece can be changed, and a lot of the workpieces can be taken out.

In this case, for example, a position of the center of gravity of the shape of the container in a plan view the container can be used as the center of the container. Further, in the present embodiment, the workpiece is moved while maintaining the orientation of the workpiece, but the embodiment is not limited to this. The orientation of the workpiece may be changed when the workpiece is moved inside the container. For example, after the workpiece is lifted, the movement control unit may control the robot so as to release the workpiece after rotating the workpiece by 90 degrees in the horizontal plane.

The three-dimensional sensor of the present embodiment includes the two two-dimensional cameras, but the embodiment is not limited to this. The three-dimensional sensor may include three or more of the two-dimensional cameras. By employing the three-dimensional sensor including the three or more cameras, even when some of the images are not clear due to halation or the like, the three-dimensional information can be acquired on the basis of the images captured by the other cameras. Further, the three-dimensional sensor of the present embodiment is provided with the projector, but the three-dimensional sensor need not necessarily be provided with the projector. Furthermore, as the three-dimensional sensor, any sensor that can acquire the information about the distance to the workpiece can be used. For example, the three-dimensional sensor may be a time of flight (TOF) camera that captures a distance image by using the time of flight method.

The range sensor 6 of the present embodiment is fixed to the support member 83, but the embodiment is not limited to this, and the range sensor 6 can be arranged so as to be able to capture the image of the workpiece. For example, the range sensor may be fixed to the wrist of the robot such that the range sensor moves integrally with the wrist. In this case, the position and orientation of the range sensor change along with the wrist. Then, depending on the position and orientation of the range sensor, there is a case in which, due to a dead angle of one of the workpieces, an image of another workpiece cannot be captured. However, in the robot system of the present embodiment, since the position and orientation of the workpiece can be changed when the workpiece cannot be gripped by the grip regions of the hand, this system is preferable to the robot system in which the range sensor moves.

According to the present embodiment, a robot system and a control method of the robot system can be provided that are capable of taking out many workpieces from the workpieces loaded in bulk.

In each of the above-described controls, the sequence of steps may be changed as appropriate, within such a range that the functionality and effects thereof are not changed.

The above-described embodiments can be combined as appropriate. Identical or equivalent parts are given identical reference numerals in the above-described drawings. Note that the above-described embodiments are merely examples and are not intended to limit the invention. Changes to the embodiments as indicated in the claims are also included in the embodiments.

The invention claimed is:

1. A robot system for taking out each of workpieces loaded in bulk inside a container, the robot system comprising:
   a hand including a plurality of claw parts and configured to grip the workpiece by using the claw parts;
   a robot configured to move the hand;
   a three-dimensional sensor configured to acquire information about a distance to the workpiece; and
   a controller configured to control the hand and the robot; wherein
   the claw parts include grip regions having a shape for gripping the workpiece,
   the controller includes
      an acquisition unit configured to acquire three-dimensional information of the workpiece on the basis of an output of the three-dimensional sensor,
      a selection unit configured to select a target workpiece to be taken out by the robot on the basis of the three-dimensional information of the workpiece,
      a collision detecting unit configured to stop the robot in response to the hand colliding with the workpiece while the robot is moving to a target position for gripping the target workpiece,
      a position detecting unit configured to detect a stop position of the robot stopped by the collision detecting unit,
      a determination unit configured to determine, on the basis of the target position and the stop position of the robot, whether or not the target workpiece is able to be gripped by a part other than the grip regions of the hand, and
      a movement control unit configured to control the robot so as to move the workpiece inside the container, and
   when the determination unit determines that the target workpiece is able to be gripped by the part other than the grip regions, the movement control unit performs a control for gripping the target workpiece by the hand, and releasing the target workpiece after moving the target workpiece.

2. The robot system according to claim 1, wherein the movement control unit controls the robot so as to move the target workpiece toward a center of the container in a plan view of the container.

3. The robot system according to claim 1, wherein the movement control unit controls the robot such that, after gripping the target workpiece by the hand, the robot lifts the target workpiece and moves the target workpiece.

4. The robot system according to claim 1, wherein the movement control unit controls the robot such that, after gripping the target workpiece by the hand, the robot moves the target workpiece in a horizontal direction without lifting the target workpiece.

5. The robot system according to claim 1, wherein when the determination unit determines that the target workpiece is not able to be gripped by the part other than the grip region, the movement control unit controls the robot so as to move the hand in the horizontal direction without driving the claw parts, and press the workpiece by the hand.

6. A robot system for taking out each of workpieces loaded in bulk inside a container, the robot system comprising:
   a hand including a plurality of claw parts and configured to grip the workpiece by using the claw parts;
   a robot configured to move the hand;
   a three-dimensional sensor configured to acquire information about a distance to the workpiece; and
   a controller configured to control the hand and the robot; wherein
   the claw parts include grip regions having a shape for gripping the workpiece,
   the controller includes
      an acquisition unit for acquiring three-dimensional information of the workpiece on the basis of an output of the three-dimensional sensor,
      a selection unit for selecting a target workpiece to be taken out by the robot, on the basis of the three-dimensional information of the workpiece,
      a collision detecting unit for stopping the robot in response to the hand colliding with the workpiece while the robot is moving to a target position for gripping the target workpiece,
      a position detecting unit for detecting a stop position of the robot stopped by the collision detecting unit,
      a determination unit for determining, on the basis of the target position and the stop position of the robot, whether or not the target workpiece is able to be pressed by a part other than the grip regions of the hand, and
      a movement control unit for controlling the robot so as to move the workpiece inside the container, and
   when the determination unit determines that the target workpiece is able to be pressed by the part other than the grip regions, the movement control unit controls the robot so as to move the hand in the horizontal direction without driving the claw parts, and press the workpiece by the hand.

7. The robot system according to claim 6, wherein the movement control unit controls the robot so as to move the target workpiece toward a center of the container in a plan view of the container.

8. A control method of a robot system including a robot and a hand provided with a plurality claw parts, for taking out each of workpieces loaded in bulk inside a container, the control method comprising:
   an image capturing step for capturing an image of the workpiece by using a three-dimensional sensor configured to acquire information about a distance to the workpiece;
   an acquisition step for acquiring three-dimensional information about the workpiece on the basis of an output of the three-dimensional sensor;
   a selection step for selecting a target workpiece to be taken out by the robot on the basis of the three-dimensional information of the workpiece;
   a stopping step for stopping the robot in response to the hand colliding with the workpiece while the robot is moving to a target position for gripping the target workpiece;
   a detection step for detecting a stop position of the robot stopped in the stopping step;
   a determination step for determining, on the basis of the target position and the stop position of the robot, whether or not the target workpiece is able to be gripped by a part other than grip regions of the hand, the grip regions having a shape for gripping the workpiece; and
   a movement step for controlling the robot so as to move the workpiece inside the container after the hand collides with the workpiece; wherein
   when it is determined in the determination step that the target workpiece is able to be gripped by the part other than the grip regions, the movement step includes a step for gripping the target workpiece by the hand and releasing the target workpiece after moving the target workpiece.

9. The control method of the robot system according to claim 8, wherein
   the movement step includes a step for controlling the robot so as to move the target workpiece toward a center of the container in a plan view of the container.

10. The control method of the robot system according to claim 8, wherein
    the movement step includes a step for controlling the robot such that, after gripping the target workpiece by the hand, the robot lifts the target workpiece and moves the target workpiece.

11. The control method of the robot system according to claim 8, wherein
    the movement step includes a step for controlling the robot such that, after gripping the target workpiece by the hand, the robot moves the target workpiece in a horizontal direction without lifting the target workpiece.

12. The control method of the robot system according to claim 8, wherein
    when it is determined in the determination step that the target workpiece is not able to be gripped by the part other than the grip regions, the movement step includes a step for controlling the robot so as to move the hand in the horizontal direction without driving the claw parts, and press the workpiece by the hand.

13. A control method of a robot system including a robot and a hand provided with a plurality claw parts, for taking out each of workpieces loaded in bulk inside a container, the control method comprising:
    an image capturing step for capturing an image of the workpiece by using a three-dimensional sensor configured to acquire information about a distance to the workpiece;
    an acquisition step for acquiring three-dimensional information about the workpiece on the basis of an output of the three-dimensional sensor;
    a selection step for selecting a target workpiece to be taken out by the robot on the basis of the three-dimensional information of the workpiece;
    a stopping step for stopping the robot in response to the hand colliding with the workpiece while the robot is moving to a target position for gripping the target workpiece;
    a detection step for detecting a stop position of the robot stopped in the stopping step;
    a determination step for determining, on the basis of the target position and the stop position of the robot, whether or not the target workpiece is able to be pressed by a part other than grip regions of the hand, the grip regions having a shape for gripping the workpiece; and a movement step for controlling the robot so as to move the workpiece inside the container after the hand collides with the workpiece; wherein when it is determined in the determination step that the target workpiece is able to be pressed by the part other than the grip regions, the movement step includes a step for controlling the robot so as to move the hand in the horizontal direction without driving the claw parts, and press the workpiece by the hand.

14. The control method of the robot system according to claim 13, wherein the movement step includes a step for controlling the robot so as to move the target workpiece toward a center of the container in a plan view of the container.

* * * * *